T. J. PARKS.
LOCK NUT.
APPLICATION FILED FEB. 15, 1911.

994,688.

Patented June 6, 1911.

Witnesses

Inventor
Thomas J. Parks
By Victor J. Evans
Attorney

UNITED STATES PATENT OFFICE.

THOMAS J. PARKS, OF CHARLEY, KENTUCKY.

LOCK-NUT.

994,688.

Specification of Letters Patent. Patented June 6, 1911.

Application filed February 15, 1911. Serial No. 608,672.

*To all whom it may concern:*

Be it known that I, THOMAS J. PARKS, a citizen of the United States, residing at Charley, in the county of Lawrence and State of Kentucky, have invented new and useful Improvements in Lock-Nuts, of which the following is a specification.

This invention relates to improvements in lock nuts and the object of the invention is to simplify and improve the existing art by providing a device of this character which is extremely simple of construction, cheap to manufacture and which will perform the function for which it is devised with accuracy and surety.

With the above and other objects in view which will appear as the description progresses, the invention resides in the novel construction and arrangement of parts hereinafter fully described and claimed.

Figure 1:
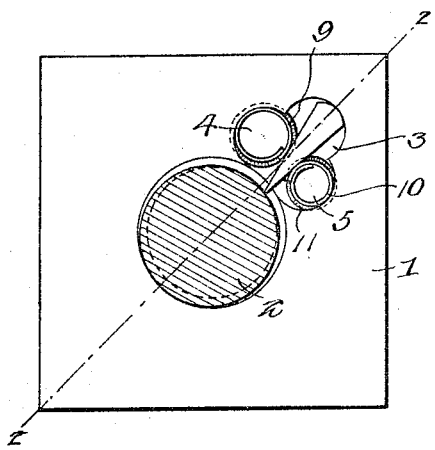
Figure 3:
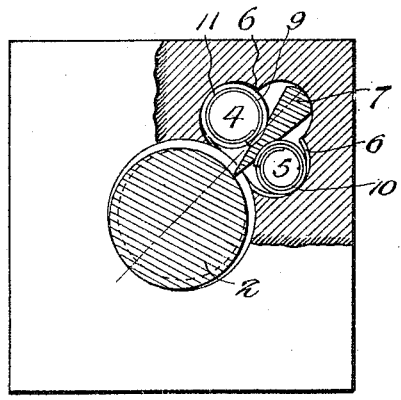
Figure 2:
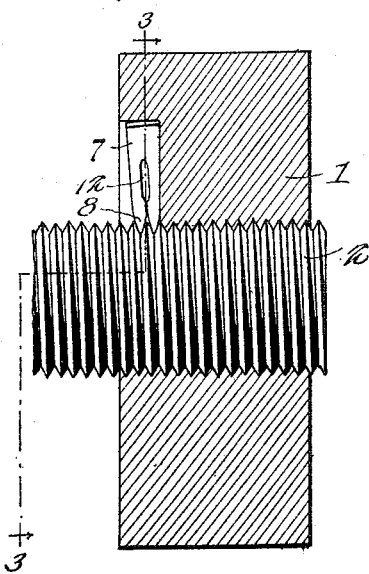
Figure 4:
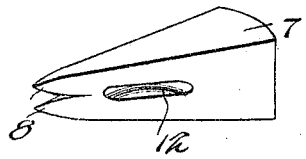
Figure 5:

In the drawing accompanying this specification there has been illustrated a simple and preferred embodiment of the improvement and in which drawing, Figure 1 is a front elevation of a lock nut constructed in accordance with the present invention, the bolt being shown in position thereon, said bolt being shown in section. Fig. 2 is a sectional view upon the line 2—2 of Fig. 1. Fig. 3 is a detail horizontal sectional view upon the line 3—3 of Fig. 2. Fig. 4 is a detail perspective view of the locking dog. Fig. 5 is a similar view of one of the retaining springs.

In the accompanying drawings, the numeral 1 designates a nut. This nut may be either square, hexagonal or of any other desired shape and is, of course, provided with the usual threaded bore which is adapted for the reception of the bolt 2. In the drawings the nut has been illustrated as square and the said nut has one of its faces adjacent one of its corners provided with a recess 3. The recess is adapted to communicate with the bore of the nut and the said recess has its rear wall rounded.

The numerals 4 and 5 designate depressed or cut away portions, the same being of a substantially semicircular formation and the walls provided by the said cut away portions are formed with grooves or pockets 6. The numeral 7 designates the bolt locking dog. The dog 7 has its rear face rounded and is adapted to snugly fit within the rounded wall provided by the recess 3. The dog is substantially V-shaped and has its sharpened edge preferably provided with teeth 8. The dog is of a sufficient length to project within the threaded bore of the nut when in the position illustrated in Fig. 1 of the drawings. When the dog is rotated toward and into contact with either of the front walls provided by the recess 3, the toothed edge thereof is brought out of the bore so that the bolt may be readily inserted within the bore of the bolt.

The numerals 9 and 10 designate the spring members which are adapted to be received within the cut away portions 4 and to contact with the opposite sides of the locking dog within the recess 3. These springs are each constructed of a single piece of resilient material and have their central portions bulged or otherwise provided with continuous enlargements designated by the numerals 11. These enlargements are adapted to be received within the grooves or pockets 6 provided by the walls formed by the cut away portions 4 and 5. The side faces of the locking dog 7 are provided with depressions 12 and the projecting enlargements of the springs opposite those engaged within the pockets are positioned within the said depressions 12.

By reference to the several figures of the drawing, it will be noted that each of the spring members comprises a substantially slitted ring and from the above description taken in connection with the accompanying drawings, it will be noted that the said spring members not only serve to exert opposite pressure upon the locking dog to retain the same in engagement with a bolt, but also provide means whereby the accidental removal of the dog, as well as the accidental removal of the springs is effectively prevented.

Having thus fully described the invention, what I claim as new, is:—

The combination with a nut having a recess adjacent one of the corners thereof, said recess communicating with the bore of the nut, the said nut being provided with semi-cylindrical cut away portions communicating with the recess, the inner wall formed by the recess being rounded, a substantially V-shaped locking dog having a rounded end adapted to be positioned within the recess and to contact with the rounded wall formed thereby, the said dog being of a length sufficient to overlie the recess when in its straightened or engaging position, a...

said dog adapted to engage with the outer walls formed by the recess when in its disengaged position, the sides of the dog being provided with depressions, the walls provided by the rounded cut away portions being each provided with grooves, and a pair of spring members, each comprising a split ring, having their central portions offset or bulging, adapted to engage the pockets provided by the grooves and the depressions of the locking dog.

THOMAS J. PARKS.

Attest:
W. M. CHAPMAN,
D. B. MEAD.